US008273981B2

(12) United States Patent
Kobayashi

(10) Patent No.: US 8,273,981 B2
(45) Date of Patent: Sep. 25, 2012

(54) STRUCTURE FOR SECURING SOLAR CELL MODULES AND FRAME AND SECURING MEMBER FOR SOLAR CELL MODULES

(75) Inventor: Shuichi Kobayashi, Takahama (JP)

(73) Assignee: Yanegijutsukenkyujo Co., Ltd., Takahama, Aichi (JP)

( * ) Notice: Subject to any disclaimer, the term of this patent is extended or adjusted under 35 U.S.C. 154(b) by 139 days.

(21) Appl. No.: 12/810,813

(22) PCT Filed: Jul. 9, 2009

(86) PCT No.: PCT/JP2009/062499
§ 371 (c)(1),
(2), (4) Date: Jun. 25, 2010

(87) PCT Pub. No.: WO2010/125699
PCT Pub. Date: Nov. 4, 2010

(65) Prior Publication Data
US 2011/0047903 A1    Mar. 3, 2011

(30) Foreign Application Priority Data
May 1, 2009   (JP) .................. 2009-111741

(51) Int. Cl.
H02N 6/00 (2006.01)
H01L 31/042 (2006.01)
E04D 13/18 (2006.01)
E04H 14/00 (2006.01)
(52) U.S. Cl. ............. 136/251; 52/173.3; 126/704
(58) Field of Classification Search ........... 136/251; 52/173.3, 200, 173.1, 210–213, 204.593, 52/204.6; 126/704; 248/237
See application file for complete search history.

(56) References Cited

U.S. PATENT DOCUMENTS
4,680,905 A * 7/1987 Rockar ............................ 52/200
7,956,280 B2 * 6/2011 Kobayashi .................. 136/251

FOREIGN PATENT DOCUMENTS
JP    H11-159071 A    6/1999
JP    2001-329664 A   11/2001
(Continued)

Primary Examiner — Jeanette E. Chapman
(74) Attorney, Agent, or Firm — Apex Juris, pllc; Tracy M. Heims

(57) ABSTRACT

The present invention provides a solar cell module securing structure capable of securing solar cell modules without any trouble even when there is a change in temperature or the like, and also provides frames and securing members for the solar cell modules.

A contact portion (12e) of each of the first frames (12) of solar cell modules (10) engaged on the opposite side of a shaft portion (22) of each securing member (20) securing a solar cell module (10) to a supporting member (2) from securing units (21a) can be fastened to the shaft portion (22) with engaging screws (4) through a void (24b) from the side of the securing units (21a). The contact portion (12e) of each of the first frames (12) engaged on the side of the securing units (21a) are brought into contact with the outer end portion (24a) of each inner protrusion (24), to restrict impaction of the first frames (12). With this arrangement, a predetermined amount of space is formed between the contact portions (12e) and the shaft portions (22), and a predetermined amount of space is formed between the facing upper side faces (12a) of the first frames (12) engaged with both sides of each of the shaft portions (22).

4 Claims, 10 Drawing Sheets

FOREIGN PATENT DOCUMENTS

| | | |
|---|---|---|
| JP | 2003-343058 A | 12/2003 |
| JP | 2007-165499 A | 6/2007 |
| JP | 2008-95281 A | 4/2008 |
| JP | 2008-303660 A | 12/2008 |
| WO | WO 9118157 A1 * | 11/1991 |

* cited by examiner

FIG. 9(A)
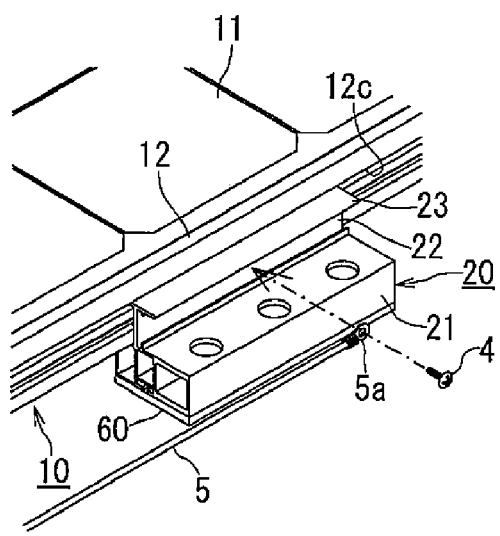
FIG. 9(B)
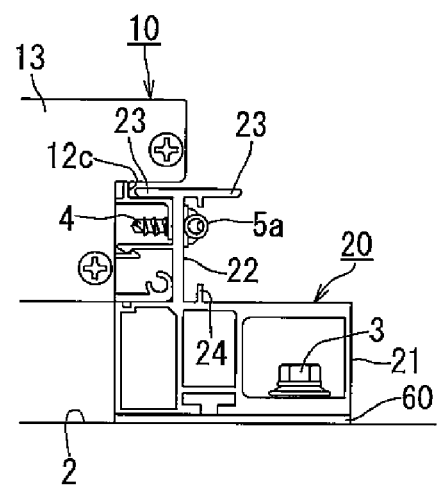
(A)
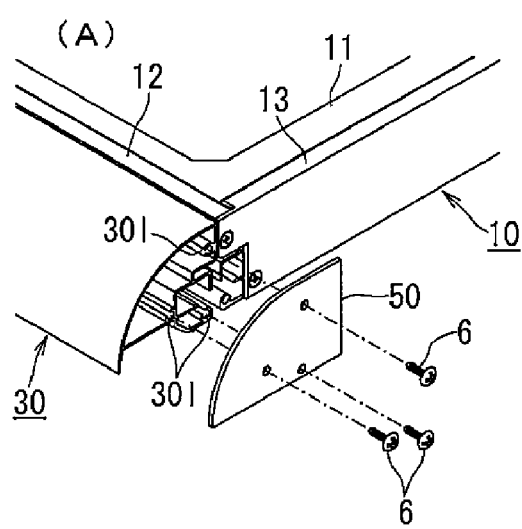
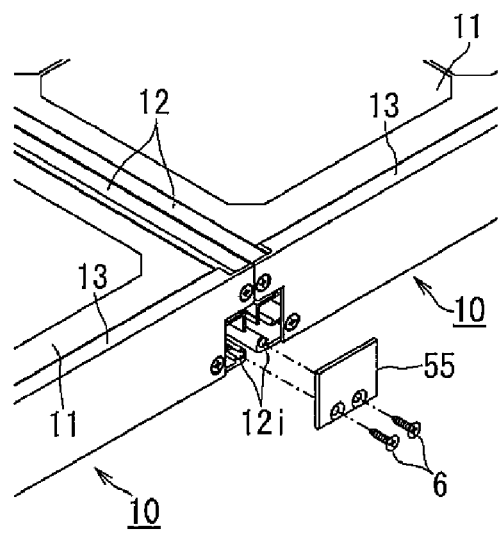
FIG. 10(A)
FIG. 10(B)

STRUCTURE FOR SECURING SOLAR CELL MODULES AND FRAME AND SECURING MEMBER FOR SOLAR CELL MODULES

CROSS REFERENCE TO RELATED APPLICATIONS

This application claims the benefit of priority upon Japanese Patent Application 2009-111741 filed on May 1, 2009, and International Patent Application PCT/JP2009/062499, filed Jul. 9, 2009 of which full contents are incorporated herein by reference.

BACKGROUND OF THE INVENTION

1. Field of the Invention

The present invention relates to a solar cell module securing structure for securing solar cell modules each having the peripheral sides of a solar cell panel supported by a frame to a predetermined supporting member such as a roof or a wall surface through the use of securing members, and also relates to the frames and the securing members for the solar cell modules.

2. Description of the Related Art

In preceding patent applications, the applicant suggests structures with which solar cell modules can be placed on a roof or the like via securing members that can be engaged with the frame bodies of the solar cell modules perpendicularly to the surface of the frame bodies and can slide along frames, where the solar cell modules each having a frame that supports peripheral sides of a plate-like solar cell panel are placed on a roof or the like (Patent Documents 1 and 2). With such structures, there is no need to attach mount pads in conformity with the pitch of solar cell modules in advance, and solar cell modules can be successively installed on a roof from one side (the eaves side, for example). Accordingly, the procedures for the installment can be simplified, and the costs can be lowered.

In a conventional solar cell module securing structure, however, the frames of adjacent solar cell modules are in direct contact with one another. Therefore, when the solar cell modules thermally expand due to a change in temperature or the like, the expanded solar cell modules press against one another, and might be deformed or damaged. In other cases where solar cell modules are secured onto a tilted roof or a wall surface or the like, the load of the solar cell modules on the upper side is transmitted to the solar cell modules on the lower side via the contact portions between the frames, and an excess load acts on the securing members that secure the solar cell modules of the lowermost row. As a result, the securing members might be deformed or slipped off the supporting member.

In view of the above circumstances, the present invention aims to provide a solar cell module securing structure that is capable of securing solar cell modules without any trouble even when there is a change in temperature or the like, and also provides frames and securing members for the solar cell modules.

[Patent Document 1] Japanese Patent Application Laid-Open No. 2007-165499

[Patent Document 2] Japanese Patent Application Laid-Open No. 2008-303660

SUMMARY OF THE INVENTION

To solve the above problems, there is provided a solar cell module securing structure according to the present invention, that secures a solar cell module to a predetermined supporting member by engaging a frame horizontally between a base unit and a top portion located on both sides of a shaft portion of a securing member, through the use of the securing member that includes the base unit, the shaft portion, and the top portion, the base unit having a securing unit for securing the solar cell module to a predetermined supporting member at a location decentered with respect to a center point in a horizontal direction, the solar cell module including a plate-like solar cell panel and a frame that supports peripheral sides of the solar cell panel, the shaft portion extending upward from a position on the opposite side of a horizontal-direction center point of an upper face of the base unit from the securing unit, the top portion protruding toward both sides from an upper end of the shaft portion and extending substantially parallel to the upper face of the base unit, the frame including: an insertion supporting portion that supports the peripheral sides of the solar cell panel inserted thereto and an upper side face extending in a vertical direction on the opposite side from the side on which the solar cell panel is inserted; a junction portion that is placed below the insertion supporting portion, and has an opening on the opposite side from the side on which the solar cell panel is inserted, the top portion of the securing member being inserted through the opening; and a contact portion that is placed below the junction portion and is located on an inner side further than the upper side face of the insertion supporting portion in a direction of a face of the solar cell panel, a face of the contact portion being brought into contact with the shaft portion of the securing member, the securing member further including an inner protrusion that is placed on the same side of the shaft portion as the securing unit between the top portion and the base unit, forms a narrower space than a space between the base unit and the top portion, and has an outer end portion extending along a shaft line substantially parallel to the shaft portion, the contact portion of the frame engaged on the opposite side of the shaft portion of the securing member from the securing unit being fastened to the shaft portion with a predetermined fastening member from the same side of the shaft portion as the securing unit goes through the space of the inner protrusion, a predetermined amount of space being formed between the contact portion and the shaft portion, with the contact portion of the frame engaged on the same side of the shaft portion of the securing member as the securing unit being brought into contact with the outer end portion of the inner protrusion to thereby prevent impaction of the frame, a predetermined amount of space being formed between the facing upper side faces of the frames engaged with both sides of the shaft portion of the securing member.

Here, examples of the "predetermined supporting member" include "roof rafters", "roof boards", "roof structural members", "roof materials such as roof tiles, slates, and corrugated plates", "wall materials", "furring strips", "wall structural members", and "mount pads placed at predetermined sites". Examples of the "fastening member" include "screws", "bolts", and "rivets".

In each of the conventional solar cell module securing structures disclosed in Patent Documents 1 and 2, on the other hand, the securing units of securing members for securing the solar cell modules to a supporting member are secured to face the ridge side of a tilted roof, and the frames of the solar cell modules on the eaves side can support downward movement with the securing members secured on the eaves side. However, the frames on the ridge side support the solar cell modules only by the engagement between the engaging protrusions of the frames and the engaged protrusions of the securing members. As a result, the supporting strength of the frames on the ridge side becomes weaker than that of the frames on the eaves side.

To counter this problem, the supporting strength can be increased by putting screws or the like into the frames on the ridge side through the shaft portions of the securing members from the ridge side, and fastening the frames on the ridge side to the securing members with screws or the like. In such a case, however, the frames are in contact with both sides of each shaft portion. Therefore, if the head portions of screws or the like protrude from the shaft portions, the amount of impaction of the frames with respect to the securing members becomes smaller, and the supporting strength against the frames on the eaves side might become smaller. Also, there is the need to perform counter boring to form stepwise holes or countersinks at the shaft portions, so as to prevent the head portions of screws or the likes from protruding. As a result, the production costs of the securing members become higher. Also, the head portions of screws or the like need to be accommodated in counterbores, so as to prevent the head portions from protruding from the shaft portions. Therefore, care needs to be taken in the manufacturing operations, and the operating costs become higher.

When solar cell modules are to serve as the ground, the crimp-type terminals at the top ends of ground cables are attached to frames with predetermined screws in conventional cases. This process is independent of the securing process with the securing members, and greater care is required. When the frames on the ridge side are fastened to the shaft portions of the securing members with screws or the like, the crimp-type terminals of ground cables may be attached at the same time. In such a case, however, the ground cables and the crimp-type terminals naturally protrude from the shaft portions, and the above-described problems are caused.

According to the present invention, each frame (each solar cell module) is secured to a predetermined supporting member, with a predetermine amount of space being formed between the frames of the solar cell modules engaged on both sides of each shaft portion of the securing members. With this arrangement, even when the solar cell modules (or the frames) thermally expand due to a change in temperature or the like, the expansion is absorbed by the spaces, and the frames can be prevented from being brought into contact with one another. Accordingly, the solar cell modules can be prevented from being deformed or damaged due to the thermal expansion. The predetermined amount of space between the frames may be arbitrarily set depending on the material of the solar cell modules or the frames, and is preferably in the range of 0.5 to 5 mm, for example. If the predetermined amount of space between the frames is smaller than 0.5 mm, the thermal expansion might not be completely absorbed. If the predetermined amount of space is greater than 5 mm, the appearance might deteriorate as the spaces between the frames become too large, and foreign matters might easily enter below the solar cell modules through the spaces.

A predetermined amount of space is also formed between the frames of solar cell modules engaged with both sides of each shaft portion of the securing members. Accordingly, when solar cell modules are installed on a tilted surface such as a roof or on a wall surface, the load of the solar cell modules located on the upper side can be prevented from being transmitted directly to the solar cell modules located on the lower side, and an excess load does not act on the securing members that support the frames of the solar cell modules on the lower side. With this arrangement, the securing members can be prevented from being deformed or damaged due to the excess load, and can be prevented from slipping off the supporting member. Also, the securing strength of the solar cell modules can be increased, and the reliability and security in the installment of the solar cell modules can be improved accordingly.

Further, the contact portions of the frames engaged on the opposite side of the shaft portions of the securing members from the securing units can be fastened to the shaft portions with fastening members such as screws, and a predetermined amount of space is formed between the contact portions of the frames on the securing unit side of the shaft portions at the fastenable portions. Accordingly, even if head portions protrude from the shaft portions, the head portions can be accommodated in the spaces even if they protrude from the shaft portions, and the contact portions (the frames) can be fastened to the shaft portions with fastening members that have such large head portions as to protrude from the shaft portions. With this arrangement, the supporting strength of the frames with the securing members can be increased by fastening the contact portions of the frames engaged on the opposite side of the shaft portions of the securing members from the securing units to the shaft portions. Furthermore, there is no need to perform counter boring on the portions to be fastened to the shaft portions with the fastening members. Accordingly, an increase in the production costs of the securing members can be prevented. Also, the fastening operation through the use of the fastening members can be simplified, and the operating costs can be lowered.

As described above, a predetermined amount of space is also formed between the shaft portions and the contact portions of the frames on the securing unit side. Accordingly, the terminals of the ground cables can be accommodated in the spaces. When the contact portions of the frames are fastened to the shaft portions with fastening members, the terminals of the ground cables can be attached together. Accordingly, the operation to attach the ground cables can be simplified, and the ground cables can be appropriately extended to the outside through the spaces.

The solar cell module securing structure according to the present invention is also characterized in that "the securing member has the base unit formed into a horizontally long, box-like shape".

With this arrangement, the rigidity of the base units of the securing members can be further increased. Even if a large load acts on the solar cell modules due to a typhoon, strong wind, heavy rain, accumulated snow, or the like, the securing members can be prevented from being deformed or damaged, and the solar cell modules can be more firmly secured to the predetermined supporting member. A predetermined reinforcing rib may be provided in each box-like base member. With this arrangement, the rigidity of the base members can be further increased.

Also, since the base unit of each securing member has a box-like shape, the upper face of each of the base units on which the frames are to be placed is made longer, and the frames of the solar cell modules can be easily placed on the securing members that have been attached to supporting members. Accordingly, the workability can be improved.

A frame for solar cell modules according to the present invention is "a frame for solar cell modules that supports peripheral sides of a solar cell panel in a solar cell module and is engaged horizontally between a base unit and a top portion located on both sides of a shaft portion of a securing member, through the use of the securing member that includes the base unit, the shaft portion, the top portion, and an inner protrusion, the base unit having a securing unit for securing the solar cell module to a predetermined supporting member at a location decentered with respect to the center point in the horizontal direction, the shaft portion extending upward from a position on the opposite side of the horizontal-direction center of the upper face of the base unit from the securing unit, the top portion protruding toward both sides from the upper end of the shaft portion and extending substantially parallel to the upper face of the base unit, the inner protrusion being placed on the same side of the shaft portion as the securing unit between the top portion and the base unit, the inner protrusion forming a narrower space than the space between the base unit and the top portion, the inner protrusion having an outer end portion extending along a shaft line substantially parallel to the shaft portion, the frame including: an insertion supporting portion that supports the peripheral sides of the solar cell panel inserted thereto and an upper side face extending in the vertical direction on the opposite side from the side on which the solar cell panel is inserted; a junction portion that is placed below the insertion supporting portion, and has an opening on the opposite side from the side on which the solar cell panel is inserted, the top portion of the securing member being inserted through the opening; and a contact portion that is placed below the junction portion and is located on an inner side further than the upper side face of the insertion supporting portion in the direction of a face of the solar cell panel, a face of the contact portion being brought into contact with the shaft portion of the securing member, the contact portion being brought into contact with the outer end portion of the inner protrusion to close part of the space."

According to the present invention, the junction portion to which the top portion of each securing member is to be inserted is provided below the insertion supporting portion that supports the peripheral sides of the solar cell panel. With this arrangement, the portion below the junction portion is engaged between the top portions of the securing members and the base units. With this portion being engaged with and secured to the securing members, the top portions of the securing members are not exposed through the upper face of the frame, and the appearance of the upper face of the installed solar cell panel becomes neat and sophisticated. Also, with the frame according to the present invention, the frame used in the above described solar cell module securing structure can be certainly embodied, and the same effects as above can be achieved.

A securing member for solar cell modules according to the present invention is "a securing member for solar cell modules that secures a solar cell module to a predetermined supporting member, the solar cell module having a frame that supports peripheral sides of a plate-like solar cell panel, the securing member including: a base unit that has a horizontally long, box-like shape and has a securing unit for securing the securing member to a predetermined supporting member at a location decentered with respect to the center point in a horizontal direction; a shaft portion that extends upward from a position on the opposite side of the horizontal-direction center point of the upper face of the base unit from the securing unit; a top portion that protrudes toward both sides from the upper end of the shaft portion and extends substantially parallel to the upper face of the base unit; and an inner protrusion that is placed on the same side of the shaft portion as the securing unit between the top portion and the base unit, the inner protrusion forming a narrower space than a space between the base unit and the top portion, the inner protrusion having an outer end portion extending along a shaft line substantially parallel to the shaft portion, the frame of the solar cell module being horizontally engaged between the base unit and the top portion on both sides of the shaft portion, impaction of the frame engaged between the base unit and the top portion being prevented by the outer end portion of the inner protrusion."

According to the present invention, the frames of solar cell modules can be engaged horizontally on both sides of the shaft portions of the securing members, and impaction of frames engaged on the same side of the shaft portions as the securing units is retrained by the inner protrusions. Since a predetermined amount of space can be formed between the shaft portions and the frames on the same side of the shaft portions as the securing units, the frames of adjacent solar cell modules can be prevented from being brought into direct contact with one another, and the same effects as above can be achieved. Any solar cell modules having the frames that can be engaged between the base units and the top portions can be secured to the predetermined supporting member, and accordingly, the securing members according to the present invention can cope with conventional solar cell modules.

As described above, a predetermined amount of space can be formed between the shaft portions and the frames on the same side of the shaft portions as the securing units. Accordingly, the frames engaged on the opposite side of the shaft portions from the securing units can be fastened to the shaft portions with fastening members, so that the head portions of the fastening members such as screws can be accommodated in the spaces. Also, the supporting strength of the securing members for the frames can be increased, and ground cables can be attached via the fastening members. Further, since each base unit has a horizontally long, box-like shape, the upper faces on which the frames are to be placed are long, and the frames of the solar cell modules can be easily placed on the securing members. Thus, the workability can be improved.

As described above, the present invention can provide a solar cell module securing structure that is capable of securing solar cell modules without any trouble even when there is a change in temperature or the like, and also provides frames and securing members for the solar cell modules.

BRIEF DESCRIPTION OF THE DRAWINGS

FIG. 9 is a diagram for explaining the connection of a ground cable at a securing member in the solar photovoltaic system of FIG. 1.

FIG. 10 is a diagram for explaining attachment of side face caps in the solar photovoltaic system of FIG. 1.

DETAILED DESCRIPTION OF THE INVENTION

Figure 1:
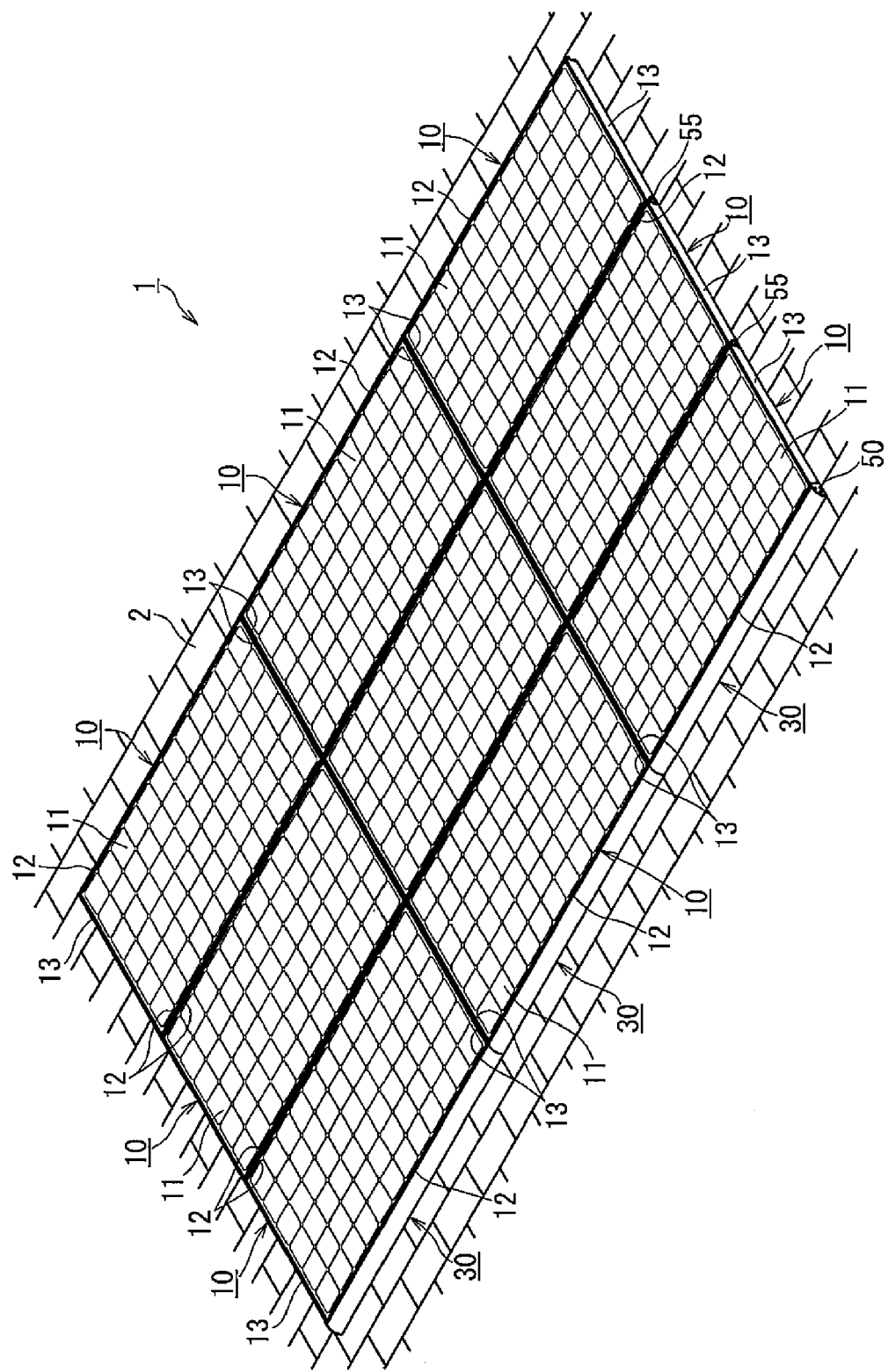
FIG. 1 is a perspective view of an entire solar photovoltaic system to which a solar cell module securing structure, and frames and securing members for solar cell modules according to an embodiment of the present invention are applied.
Figure 2:
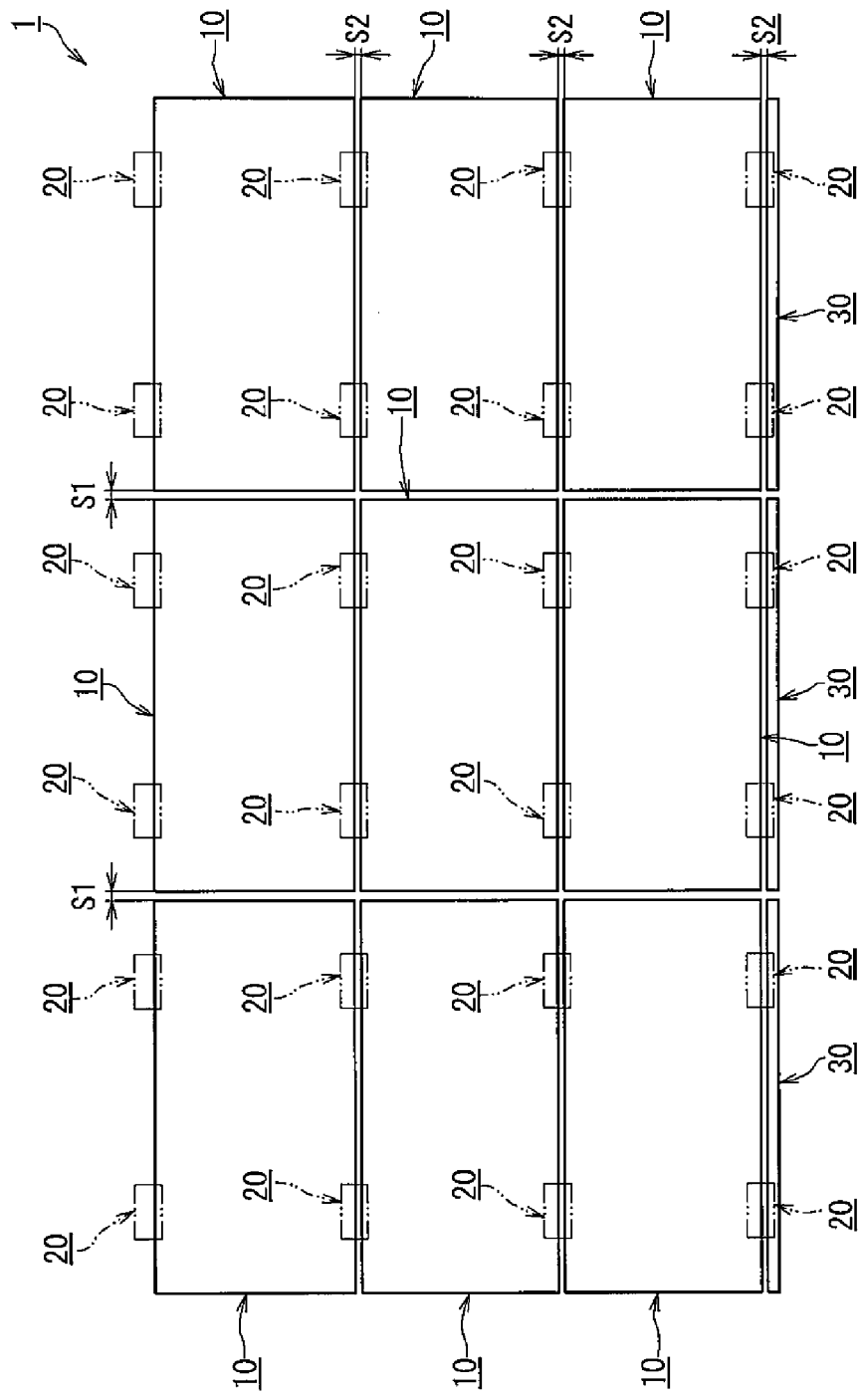
FIG. 2 is a schematic plan view of the solar photovoltaic system of FIG. 1.
Figure 3:
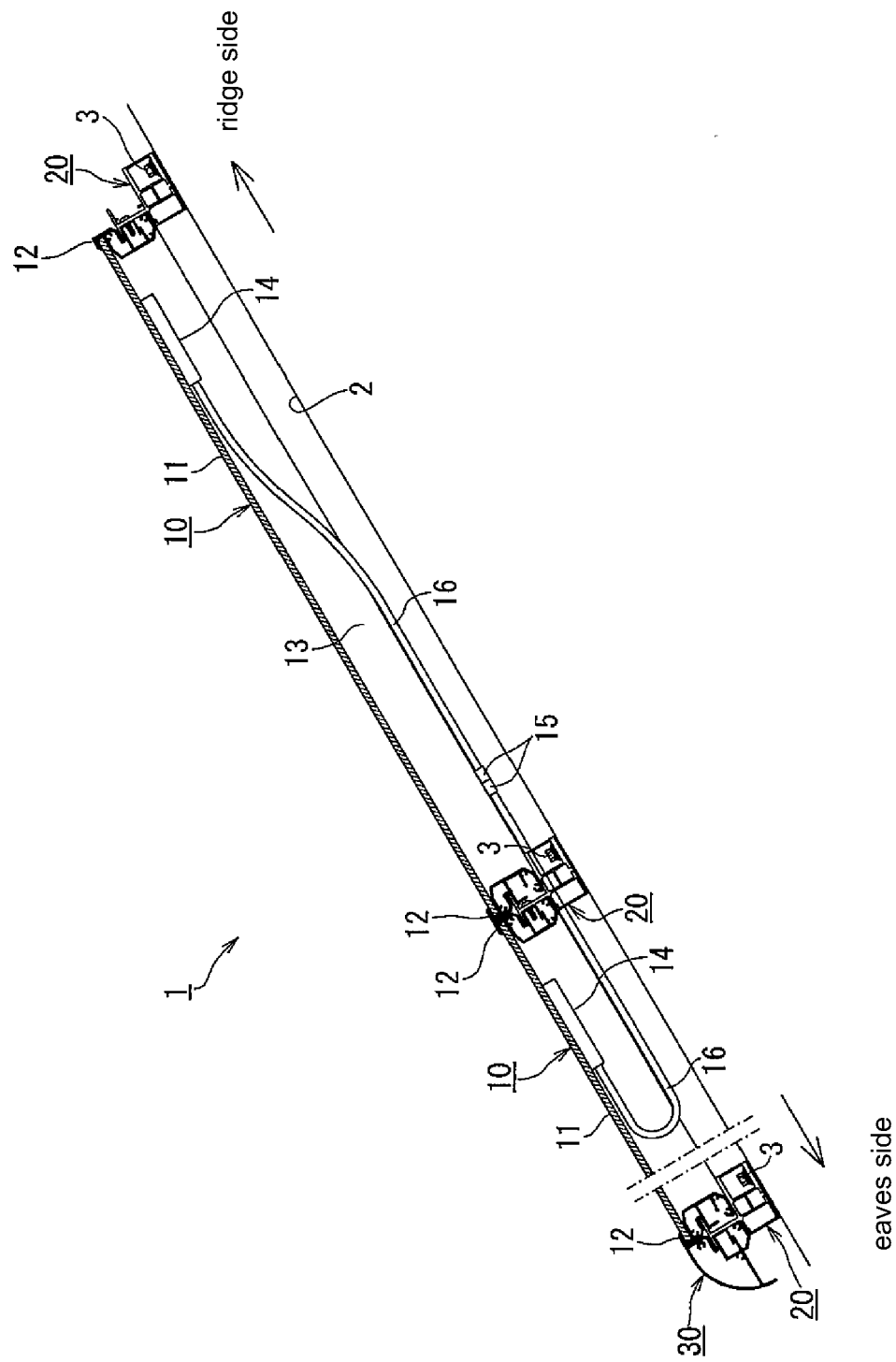
FIG. 3 is a cross-sectional side view of part of the solar photovoltaic system of FIG. 1.
Figure 4:
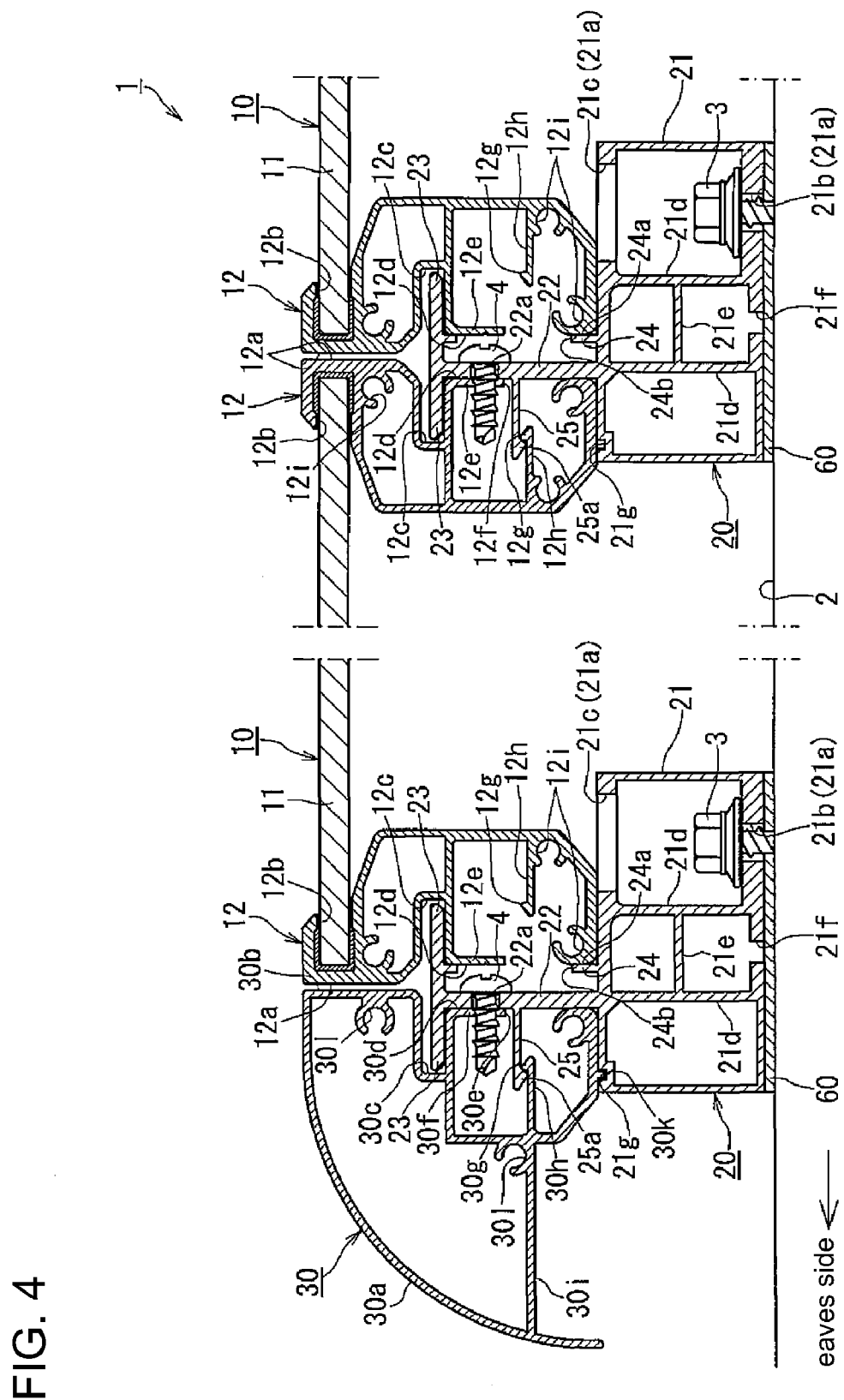
FIG. 4 is an enlarged cross-sectional side view of essential components of the solar photovoltaic system of FIG. 1.
Figure 5:
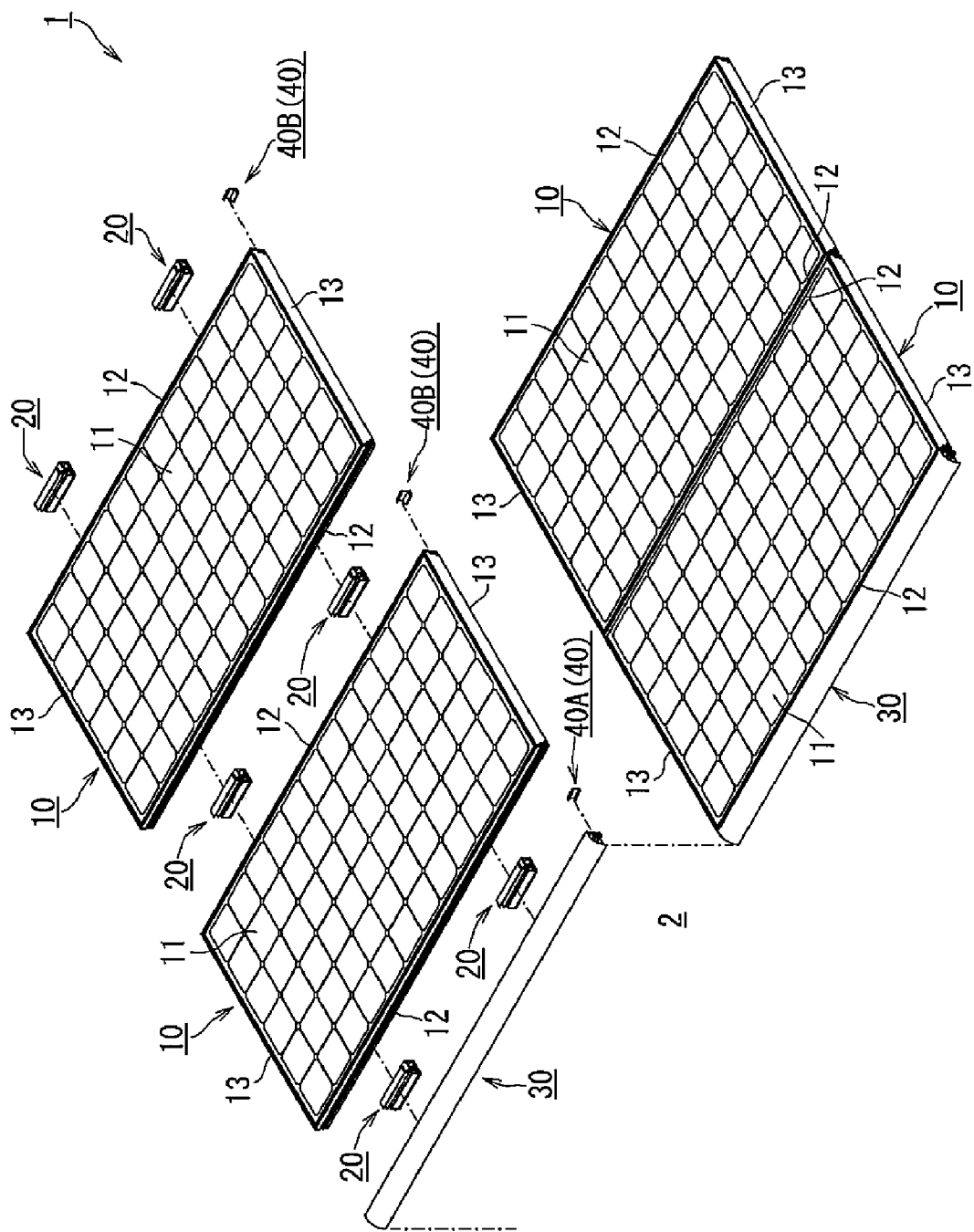
FIG. 5 is an exploded perspective view schematically showing each essential component of the solar photovoltaic system of FIG. 1.

Referring to FIGS. 1 through 11, a structure for securing solar cell modules, and frames and securing members for the solar cell modules are described in detail as an embodiment of the present invention. FIG. 1 is a perspective view of an entire solar photovoltaic system to which the structure for securing solar cell modules and the frames and the securing members for the solar cell modules as an embodiment of the present invention are applied. FIG. 2 is a schematic plan view of the solar photovoltaic system of FIG. 1. FIG. 3 is a cross-sectional side view of part of the solar photovoltaic system of FIG. 1. FIG. 4 is an enlarged cross-sectional side view of the essential parts of the solar photovoltaic system of FIG. 1. FIG. 5 is a schematic exploded perspective view of each main component of the solar photovoltaic system of FIG. 1. FIG. 6(A) is an end elevational view of an ornamental cover used for the solar photovoltaic system of FIG. 1. FIG. 6(B) is an end elevational view of the frame for solar cell modules of the embodiment of the present invention that is used in the solar photovoltaic system of FIG. 1. FIG. 6(C) is an end elevational view of the securing member for a solar cell module according to the embodiment of the present invention that is used in the solar photovoltaic system of FIG. 1. FIG. 6(D) is a perspective view of the securing member of FIG. 6(C).

Figures 11A, 11B:
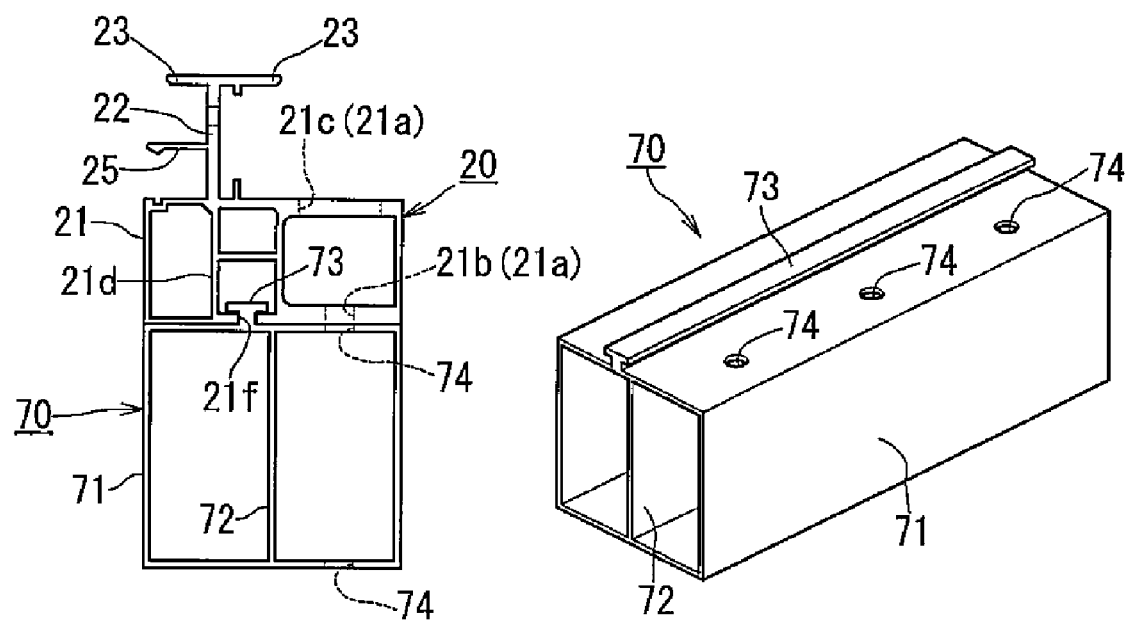
FIG. 11 shows an example of a spacer member in the solar photovoltaic system of FIG. 1.

FIG. 7 is a diagram for explaining a method for securing solar cell modules in the solar photovoltaic system of FIG. 1. FIG. 8(A) is a diagram for explaining the connection between ornamental covers in the solar photovoltaic system of FIG. 1. FIG. 8(B) is a diagram for explaining the connection between the end portions of solar cell modules in the solar photovoltaic system of FIG. 1. FIG. 9 is a diagram for explaining the connection with a ground cable at each securing member in the solar photovoltaic system of FIG. 1. FIG. 10 is a diagram for explaining the attachment of a side face cap in the solar photovoltaic system of FIG. 1. FIG. 11 shows an example of a spacer member in the solar photovoltaic system of FIG. 1.

The solar photovoltaic system 1 of this embodiment includes a plurality of solar cell modules 10, securing members 20 that secure the solar cell modules 10 onto a predetermined supporting member 2 such as a roof material, ornament covers 30 that cover the eaves-side end faces of the solar cell modules 10 located closest to the eaves, connecting members 40 that connect the ornament covers 30 to one another and connect the solar cell modules 10 to one another, eaves-side side face caps 50 that cover the linking portions between the side faces of the ornamental covers 30 and the side faces of the solar cell modules 10, and intermediate side face caps 55 that cover the linking portions among the side faces of the solar cell modules 10.

As shown in FIG. 4 and the others, the solar photovoltaic system 1 includes a plate-like waterproof member 60 made of rubber, silicon, or the like between each securing member 20 and the supporting member 2. Although not shown in the drawing, the waterproof member 60 has an adhesive layer on either face, and one of the adhesive layers adheres to the bottom face of the securing member 20 in advance. Exfoliate paper is bonded to the other one of the adhesive layers. In this example, the solar photovoltaic system 1 is placed on a slate as the predetermined supporting member 2. However, the solar photovoltaic system 1 may be placed on some other roof material such as roof tiles, corrugated plates, or corrugated sheets, or may be placed on a long crosspiece member, a long mount pad, a long wall surface, or the like placed on a roof board, a roof, or the like.

Each of the solar cell modules 10 in this solar photovoltaic system 1 includes a plate-like solar cell panel 11 that is rectangular in an outer shape, a first frame 12 that supports two facing peripheral side portions (the longer two facing peripheral side portions in this example) of the solar cell panel 11, a second frame 13 that supports two facing peripheral side portions (the shorter two facing peripheral side portions in this example) of the solar cell panel 11 that extend in a direction substantially perpendicular to the first frame 12, a substrate box 14 that is secured to the rear surface of the solar cell panel 11, and a distributing cable 16 that extends from the substrate box 14, has electric power or the like passing therethrough, and has a connector 15 at its end portion.

Figure 6A:
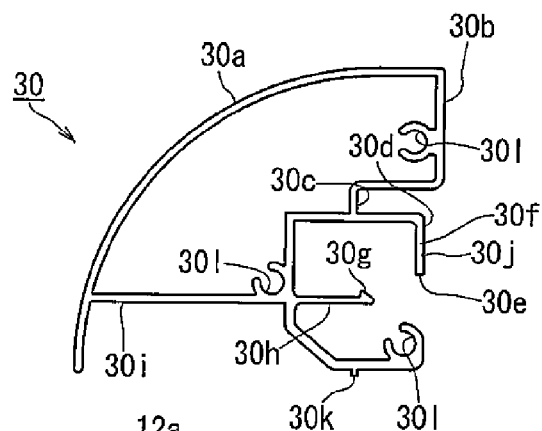
FIG. 6(A) is an end elevational view of an ornamental cover used in the solar photovoltaic system of FIG. 1.
Figure 6B:
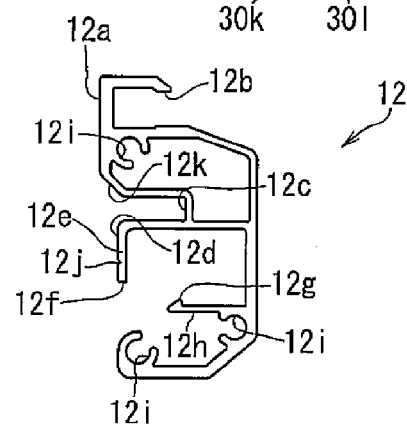
FIG. 6(B) is an end elevational view of a frame for solar cell modules as an embodiment of the present invention used in the solar photovoltaic system of FIG. 1.
Figures 6C, 6D:
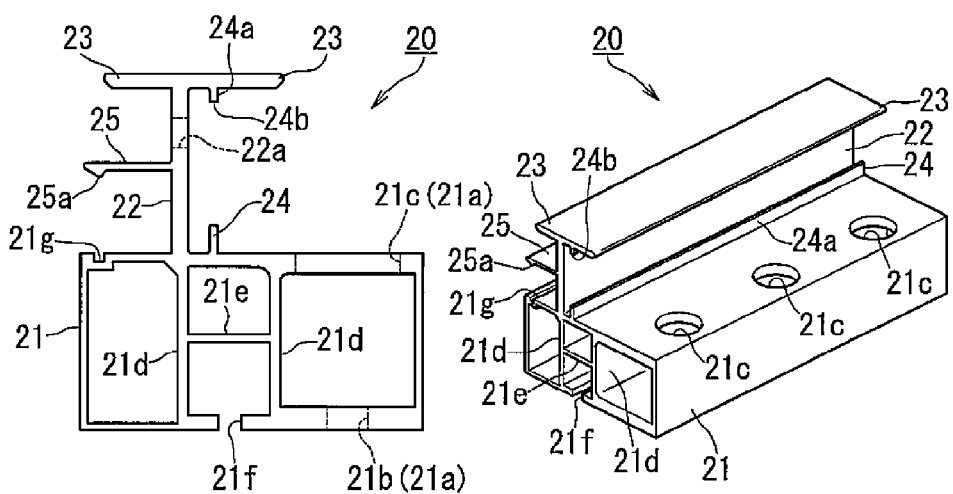
FIG. 6(C) is an end elevational view of a securing member for solar cell modules as an embodiment of the present invention used in the solar photovoltaic system of FIG. 1.
FIG. 6(D) is a perspective view of the securing member of FIG. 6(C).

As shown in FIG. 6(B) and others, the first frame 12 in each solar cell module 10 includes: an insertion supporting portion 12b that supports the peripheral side portions of an inserted solar cell panel 11 and has an upper side face 12a extending vertically on the opposite side from the side on which the solar cell panel 11 is inserted; a junction portion 12c that is placed below the insertion supporting portion 12b opens to the opposite side from the side on which the solar cell panel 11 is inserted; a box-like contact portion 12e that is placed below the junction portion 12c and has a lower side face 12d placed in an inner position further than the upper side face 12a of the insertion supporting portion 12b and an opening portion 12f formed in the lower side face 12d; and an engaging piece 12h that extends horizontally from the opposite side face from the lower side face 12d in the contact portion 12e toward the opening 12f, and has an engaging protrusion 12g at its top end. This engaging protrusion 12g has its base end portion protruding upward from the engaging piece 12h, and is downwardly tapered toward its top end.

The first frame 12 further includes three screw groove portions 12i that are almost C-shaped and are provided at predetermined locations, and a V-shaped groove 12j is provided in the lower side face 12d located above the opening 12f in the contact portion 12e. This first frame 12 is a continuous long member having uniform cross sections, and is an extruded member made of a metal such as aluminum. Accordingly, the two openings, which are the junction portion 12c and the opening 12f, are aligned vertically in the outer side face of the first frame 12, and the upper side face 12a and the lower side face 12d are arranged at different levels from each other, with the junction portion 12c being interposed in between. An inclined chamfered portion 12k is formed between the upper side face 12a and the junction portion 12c, so that the below-described top portion 23 of the securing member 20 is easily inserted into the junction portion 12c.

Like the first frame 12, the second frame 13 in each solar cell module 10 includes an insertion supporting unit that supports the peripheral side portions of an inserted solar cell panel 11 at its upper portion, and has a side face extending vertically on the opposite side of the insertion supporting unit from the side to which the solar cell panel 11 is inserted, though not shown specifically in the drawings. The side face extends along the entire height of the second frame 13. The second frame 13 is a continuous long member that has uniform cross sections and has the same height as the first frame 12. The second frame 13 is an extruded member made of a metal such as aluminum. Accordingly, the outer side face of the second frame 13 is a flat face without an opening or a protrusion or the like.

As shown in the drawings, each of the solar cell modules 10 of this example has the peripheral long side portions of the solar cell panel 11 supported by the first frame 12, and the peripheral short side portions of the solar cell panel 11 supported by the second frame 13. The longitudinal-direction end portions of the first frame 12 are covered with the outer side faces of the longitudinal-direction end portions of the second frame 13, and the first frame 12 and the second frame 13 are secured to each other with predetermined screws. The spaces between the peripheral edges of the solar cell panel 11 and the insertion supporting portions 12b of the first and second frames 12 and 13 are filled with a waterproof buffer material 17 (see FIG. 4 and others).

Each of the securing members 20 in the solar photovoltaic system 1 of this example includes: a horizontally long, box-like base unit 21, a shaft portion 22 that extends upward from a predetermined position on one side with respect to the horizontal-direction center of the upper face of the base unit 21; a top portion 23 that starts horizontally from the upper end of the shaft portion 22 toward both sides and extends substantially parallel to the upper face of the base unit 21; an inner protrusion 24 that is provided on the center side in the transverse direction of the base unit 21 with respect to the shaft portion 22 between the top portion 23 and the base unit 21 and extends along a shaft line substantially parallel to the shaft portion 22; and an engaged piece 25 that starts in a vertical direction from almost the center point of the shaft portion 22 between the top portion 23 of the opposite side and the base unit 21 and extends substantially parallel to the upper face of the base unit 21, with the shaft portion 22 being interposed between the inner protrusion 24 and the engaged piece 25.

The base unit 21 of this securing member 20 includes securing units 21a that are decentered from the center point in the transverse direction and secures the securing member 20 to the supporting member 2 at locations on the opposite side from the shaft portion 22. Each securing unit 21a is formed with a securing hole 21b that is formed in the lower face of the base unit 21 and allows only penetration by the screw portion of a securing screw 3 for attaching the securing member 20 to the supporting member 2, and an insertion hole 21c that penetrates through the upper face of the base unit 21 coaxially with the securing holes 21b and allow only penetration by a securing screw 3 and or the like. The insertion holes 21c and the securing holes 21b of the securing units 21a are arranged at locations that are not hidden by the top portion 23 when seen in a plan view, so that the securing screws 3 can be smoothly inserted into the securing holes 21b. Also, the insertion holes 21c each have a larger diameter than the securing holes 21b, so that the top end of an electric tool or a socket can pass through each insertion hole 21c and screw the securing screws 3 into each securing hole 21b with high precision. In this example, three securing units 21a are provided in the longitudinal direction of the securing member 20 (see FIG. 6(D)).

The base unit 21 includes two vertical ribs 21d that extend vertically inside and are located closer to the shaft portion 22 than to the securing units 21a, and a horizontal rib 21e that connects the vertical ribs 21d to each other. The vertical ribs 21d and the horizontal rib 21e form an H-shaped structure, and the vertical rib 21d further away from the securing units 21a is located immediately below the shaft portion 22. By virtue of the vertical ribs 21d and the horizontal rib 21e, the rigidity of the base unit 21 is increased. The base unit 21 further includes a slit 21f that is formed in a bottom portion interposed between the two vertical ribs 21d and has a predetermined width, and a rectangular concave portion 21g that is formed in the vicinity of the end portion of the upper face on the opposite side of the shaft portion 22 from the securing units 21a.

The shaft portion 22 of the securing member 20 has a height that is substantially equivalent to the distance from the lower face of the first frame 12 to the junction portion 12c. The shaft portion 22 has engaging holes 22a that penetrate horizontally between the top portion 23 and the engaged piece 25. The top portion 23 can be inserted into the junction portion 12c of the first frame 12. The lower corners of the end portions of the top portion 23 are chamfered diagonally, so that the top portion 23 is easily inserted into the junction portion 12c. The top portion 23 has such a length as not to protrude outward from the base unit 21 when seen in a plan view.

The inner protrusion 24 of the securing member 20 of this example is placed so as to be at a predetermined distance from the shaft portion 22 on the same side of the shaft portion 22 as the securing units 21a of the base unit 21, and extend substantially parallel to the shaft portion 22. An outer end portion 24a facing the fixing units 21a are formed along a shaft line substantially parallel to the shaft portion 22. The distance between the outer end portion 24a of the inner protrusion 24 and the shaft portion 22 is such a distance as to smoothly accommodate each head portion of the below-described engaging screws 4. As shown in the drawings, the inner protrusion 24 has a void 24b penetrating in the horizontal direction, and the length of the void 24b in the vertical direction is naturally shorter than the distance between the base unit 21 and the top portion 23. Also, the engaging holes 22a of the shaft portion 22 can be seen through the void 24b. The inner protrusion 24 is divided into an upper part and a lower part by the void 24b, and the upper part is shorter than the lower part in this example.

The engaged piece 25 of the securing member 20 is located in the position corresponding to the engaging piece 12h of the first frame 12. The engaged piece 25 has an engaged protrusion 25a that has base end portion protruding downward from the engaged piece 25, and is upwardly tapered toward its top end. With this structure, the engaged protrusion 25a can be engaged with the engaging protrusion 12g of the first frame 12. Each securing member 20 of this example is formed by cutting a predetermined length (⅙ to 1/20 of the length of each first frame 12, for example) of an extruded member that is a continuous and long member having uniform cross sections and is made of a metal such as aluminum. At the same time, the securing holes 21b and the insertion holes 21c as the securing units 21a, and the engaging holes 22a are formed.

Each ornamental cover 30 in the solar photovoltaic system 1 of this example has substantially the same height as each first frame 12 and each second frame 13, and has substantially the same length as each first frame 12. Each ornamental cover 30 includes: an ornamental face portion 30a that continuously extends like an arc from the upper end portion on one side to the lower end portion on the other side; an upper side face 30b that extends downward from the upper end portion of the ornamental face portion 30a on the one side; a junction portion 30c that is located below the upper side face 30b and is open to the side face side on the one side; a box-like contact portion 30f that includes a lower side face 30d that is located below the contact portion 30c, is closer to the other side than the upper side face 30b, and extends in the vertical direction, and an opening 30e that is formed in the lower side face 30d; an engaging piece 30h that extends horizontally from the side face on the other side in the contact portion 30f toward the opening 30e and has an engaging protrusion 30g at its top end; and a supporting piece 30i that extends horizontally from the side face of the contact portion 30f on the other side and connects to the vicinity near the lower end portion of the ornamental face portion 30a (see FIG. 6(A)). This engaging protrusion 30g has its base end portion protruding upward from the engaging piece 30h, and is downwardly tapered toward its top end.

The ornamental cover 30 further includes a V-shaped groove 30j that is formed in the lower side face 30d above the opening 30e of the contact portion 30f, and a protrusion 30k that protrudes downward from the lower face of the contact portion 30f. This protrusion 30k can be inserted into the concave portion 21g of the securing member 20. In the ornamental cover 30, three screw groove portions 30l each having substantially a C-shape are provided at predetermined locations. This ornamental cover 30 is also a continuous long member having uniform cross sections, and is an extruded member made of a metal such as aluminum.

As shown in FIG. 8, the connecting members 40 in the solar photovoltaic system 1 of this example are divided into first connecting members 40A that are used to connect the end portions of adjacent ornamental covers 30, and second connecting members 40B that are used to connect the end portions of the first frames 12 on the ridge side in adjacent solar cell modules 10. In the first connecting members 40A and the second connecting members 40B, like components are denoted by same reference numerals. In this example, the first connecting members 40A are used to connect the end portions of the ornamental covers 30, and the second connecting members 40B are used to connect the end portions of the first frames 12. However, the second connecting members 40B may be used to connect the end portions of the ornamental covers 30, and the first connecting members 40A may be used to connect the end portions of the first frames 12, depending on the circumstances.

As shown in FIG. 8, each connecting member 40 (each first connecting member 40A, each second connecting member 40B) of this example includes: a plate-like upper piece 41 that is inserted into the junction portions 12c or 30c of the first frames 12 or the ornamental covers 30 in the solar cell modules 10; a plate-like lower piece 42 that is located to face the upper piece 41 and can be brought into contact with the bottom portions of the first frames 12 or the ornamental covers 30; and a plate like connecting piece 43 that connects the end sides of the upper piece 41 and the lower piece 42 on the same side. The connecting member 40 has a rectangular shape minus a side when seen in a cross-sectional view. The connecting member 40 further includes stopper portions 44 at both ends of the upper piece 41 in the longitudinal direction. The stopper portions 44 extend toward the lower piece 42 while extending toward the connecting piece 43, and each has a hook-like shape. The stopper portions 44 bite into the bottom faces of the junction portions 12c or 30c of the first frames 12 or the ornamental covers 30, to prevent the connecting member 40 from slipping off.

The connecting member 40 further includes a V-shaped notch portion 45 substantially at the center in the longitudinal direction of the end side of the upper piece 41 on the opposite side from the connecting piece 43. With this notch portion 45, the center position of the connecting member 40 in the longitudinal direction can be recognized. The width of the top end of the notch portion 45 is 2 to 5 mm, which is substantially the same as the width of each space between the solar cell modules 10 or between the ornamental covers 30. Each connecting member 40 of this example is formed by bending and molding a metal plate member such as a stainless-steel plate.

The stopper portions 44 are formed into hook-like shapes by notching the upper piece 41 at predetermined portions at end portions in the longitudinal direction, and obliquely bending the end portions facing the connecting piece 43.

As shown in FIG. 8(B), each second connecting member 40B of the connecting members 40 further includes: a cable holding portion 46 that continues from the end side on the opposite side of the lower piece 42 from the connecting piece 43, is bent into a U-shape in combination with the lower piece 42, and can hold the distributing cable 16 extending from the solar cell module 10; and a bent portion 47 that is provided at the top end side of the cable holding portion 46 and is bent upward into an arc. This bent portion 47 prevents the distributing cable 16 from slipping off the cable holding portion 46, and facilitates insertion and holding of the distributing cable 16 into the cable holding portion 46.

Next, a method for assembling the solar photovoltaic system 1 of this example is described. In this example, as shown in FIG. 1 and others, the plurality of solar cell modules 10 are arranged in a matrix fashion so that the long sides of each solar cell module 10 extend in a direction perpendicular to the direction of tilt of the roof, and each one side of the solar cell modules 10 and the ornamental covers 30 is secured to the supporting member 2 by two securing members 20. In this example, as shown in FIG. 2, the solar cell modules 10 and the ornamental covers 30 are arranged so that spaces S1 (2 to 5 mm, approximately 3 mm in this example) are kept in the direction perpendicular to the direction of tilt of the roof, and spaces S2 (0.5 to 5 mm, approximately 1 mm in this example) are kept in the direction of tilt of the roof. With this arrangement, the solar cell modules 10, the ornamental covers 30 and the likes are not brought into contact with one another, even if they thermally expand due to a change in temperature or the like. Also, the load of the solar cell modules 10 on the upper side in the direction of tilt of the roof is prevented from being transmitted to the solar cell modules 10 on the lower side.

First, to attach the securing members 20 for securing the ornamental covers 30 to be placed on the side closest to the eaves, scratch lines extending in the direction of tilt of the roof and in the direction perpendicular to the direction of tilt are drawn to indicate the attachment positions of the securing members 20 with respect to the supporting member 2. The scratch lines extending in the direction of tilt are drawn so that, where one side of the solar cell modules 10 or the ornamental covers 30 is secured by two securing members 20, the one side substantially matches the center of one structural member located within the securing range of the securing members 20 among the plurality of structural members such as roof rafters supporting the supporting member 2. The scratch lines extending in the direction perpendicular to the direction of tile are drawn in such positions that the securing members 20 do not hinder the step portions between the roof materials (slates) serving as the supporting member 2.

A predetermined number (two in this example) of securing members 20 slide in the longitudinal direction of each ornamental cover 30, and the end portions of the securing members 20 are engaged with the ornamental cover 30, so that each top portion 23 on the opposite side of the shaft portion 22 of each securing member 20 from the securing units 21a and the junction portion 30c of each ornamental cover 30 are inserted into and engaged with each other, the engaged protrusion 25a of the engaged piece 25 of each of the securing members 20 and the engaging protrusion 30g of the engaging piece 30g of each of the ornamental covers 30 are inserted into and engaged with each other, and the concave portion 21g of each of the securing members 20 and the protrusion 30k of each of the ornamental covers 30 are inserted into and engaged with each other. In this example, the protrusion 30k is formed on each ornamental cover 30. Because of this protrusion 30k, the securing members 20 cannot be engaged with each ornamental cover 30 on the side-face side (the side of the direction perpendicular to the longitudinal direction).

With the plurality of securing members 20 being engaged with one ornamental cover 30, the exfoliate paper is removed from the waterproof member 60 on the bottom side of each securing member 20, and the securing members 20 are caused to slide in the longitudinal direction of the ornamental cover 30. Each of the securing members 20 is positioned on a scratch line drawn on the supporting member 2, and the securing members 20 are bonded to the supporting member 2 via the adhesive layer of each waterproof member 60. The securing members 20 supporting the next ornamental cover 30 are then bonded to the supporting member 2 so that the next ornamental cover 30 is located adjacent to the longitudinal side (the side extending in the direction perpendicular to the direction of tilt of the roof) of the ornamental cover 30 bonded to the supporting member 2, and the predetermined amount (2 to 5 mm, for example) of space S1 is kept between the two ornamental covers 30. The space S1 may be formed by keeping a space having the same width as the width of the top end of the V-shaped notch portion 45 of each connecting member 40, or may be formed by providing a spacer having the same thickness as the width of the space S1 between the two ornamental covers 30.

After the plurality of ornamental covers 30 are arranged on the supporting member 2, the securing screws 3 are screwed into the supporting member 2 and further into the structural members such as roof rafters through the securing units 21a of the securing members 20, to attach the securing members 20 to the supporting member 2. In this manner, the ornamental covers 30 are secured to the supporting member 2 via the securing members 20. After the ornamental covers 30 are secured by the securing members 20, the end portions of adjacent ornamental covers 30 are connected to one another by the first connecting members 40A, as shown in FIG. 8A. With this arrangement, misalignment of the ornamental covers 30 is eliminated, and the appearance can be improved.

For at least the ornamental covers 30 located on the two ends of the set of the plurality of ornamental covers 30, the engaging screws 4 are screwed into the contact portions 30f of the ornamental covers 30 through the engaging holes 22a of the securing members 20, so that the securing members 20 and the ornamental covers 30 are fastened to each other (see FIG. 4). With this arrangement, the ornamental covers 30 can be prevented from sliding in the longitudinal direction of the securing members 20. Although not shown in the drawings, a predetermined caulking compound is applied to both end portions and the lower outer periphery of the ridge-side face of each securing member 20 attached to the supporting member 2, so as to cover the waterproof members 60. With this arrangement, rainwater or the like can be prevented from entering the spaces between the supporting member 2 and the securing members 20 through the securing screws 3, and rainwater or the like can be appropriately guided to both sides of the securing members 20 by the caulking compound and be discharged to the eaves side.

After the ornamental covers 30 are secured onto the supporting member 2, a predetermined number (two in this example) of a plurality of securing members 20 are engaged with the first frames 12 on one side (the ridge side) of each solar cell module 10. More specifically, the securing members 20 are caused to slide from outside along the faces of the solar cell panels 11 in the direction perpendicular to the longitudinal direction of each first frame 12 (see FIG. 7(D)) or are caused to slide in the longitudinal direction from the end portion of each first frame in the longitudinal direction, so that the contact portion 12e of each of the first frames 12 is engaged with the space between the base unit 21 and the top portion 23 on the opposite side of the shaft portion 22 of each securing member 20 from the securing units 21a.

Through this engagement, the lower face of each first frame 12 is placed on the upper face of the base unit 21 of each corresponding securing member 20, and the top portion 23 of each securing member 20 is inserted into the junction portion 12c of each corresponding first frame 12. The contact portion 12e of each first frame 12 is brought into contact with the shaft portion 22 of each corresponding securing member 20, and the engaging protrusion 12g of each first frame 12 and the engaged protrusion 25a of each corresponding securing member 20 are engaged with each other (see FIG. 7(E)).

After the first frames 12 on the ridge side of the solar cell modules 10 are engaged with the securing members 20, the exfoliate paper is removed from the bottom side of each securing member 20 in the same manner as above. A first frame 12 on the eaves side is then placed on the upper face of the base units 21 of the two securing members 20 securing one ornamental cover 30 to the supporting member 2 (see FIG. 7(A)). Since each base unit 21 has a horizontally long, box-like shape, as shown in the drawings, the first frames 12 can be easily placed on the upper faces of the base units 21. With the first frame 12 being placed on the base units 21 of the securing members 20, the solar cell module 10 is caused to slide toward the eaves side (see FIG. 7(B)). In this manner, the top portion 23 of each securing member 20 on the side of the securing units 21a is inserted into the junction portion 12c of the first frame 12, and the lower side face 12d of the contact portion 12e of the first frame 12 is brought into contact with the outer end portion 24a of the inner protrusion 24 of each securing member 20 (see FIG. 7(C)).

With this arrangement, the first frame 12 of the solar cell module 10 on the eave side is restrained by the base units 21 of the securing members 20 from moving downward, and is restrained by the top portions 23 from moving upward. Furthermore, the first frame 12 of the solar cell module 10 on the eaves side is restrained by the inner protrusions 24 from moving outward along the face of the solar cell panel 11 (toward the eaves side). As the contact portion 12e of the first frame 12 is brought into contact with the inner protrusions 24 of the securing members 20, spaces are formed between the shaft portions 22 and the contact portions 12e, and the head portions of the engaging screws 4 are accommodated in the spaces. As shown in the drawings, the space S2 of a predetermined amount of space (approximately 1 mm in this example) is formed between the ornamental cover 30 and the first frame 12. With this arrangement, the ornamental cover 30 and the first frame 12 are not brought into contact with each other when thermally expanding due to a change in temperature or the like, and the load of the solar cell modules 10 located on the upper side with respect to the direction of tilt of the roof are not transmitted to the ornamental covers 30 and the solar cell modules 10 and the likes located on the lower side.

Figure 7A:
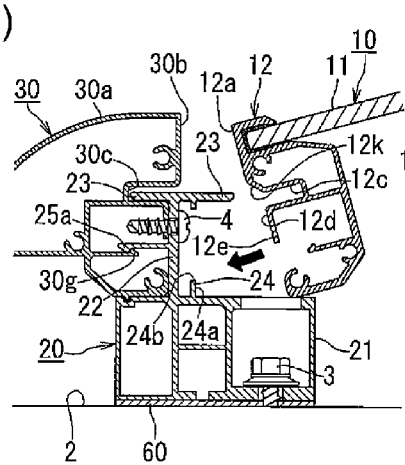
FIG. 7 is a diagram for explaining a method for securing solar cell modules in the solar photovoltaic system of FIG. 1.
Figure 7D:
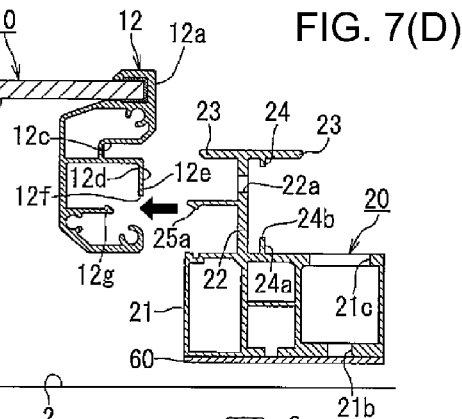
Figure 7B:
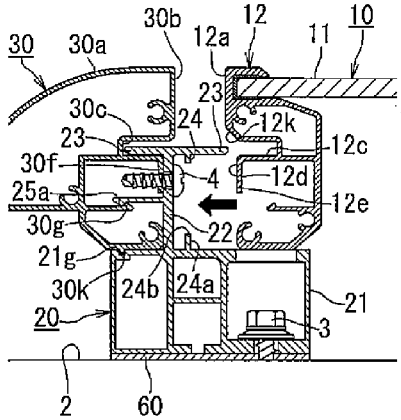
Figure 7E:
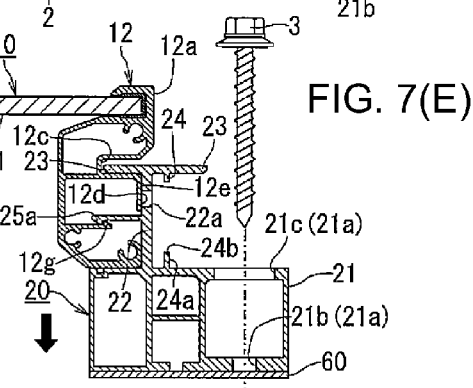
Figure 7C:
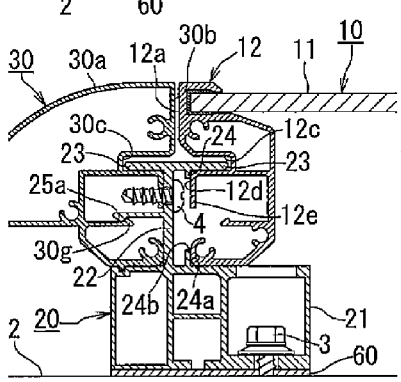
Figure 7F:
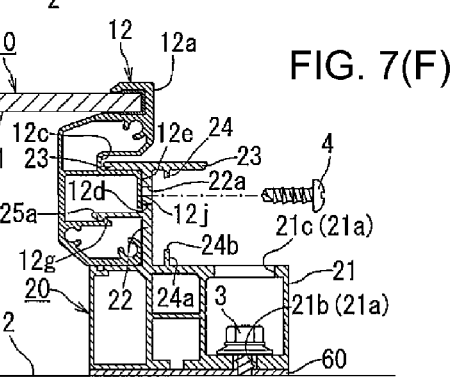
Figure 8A:
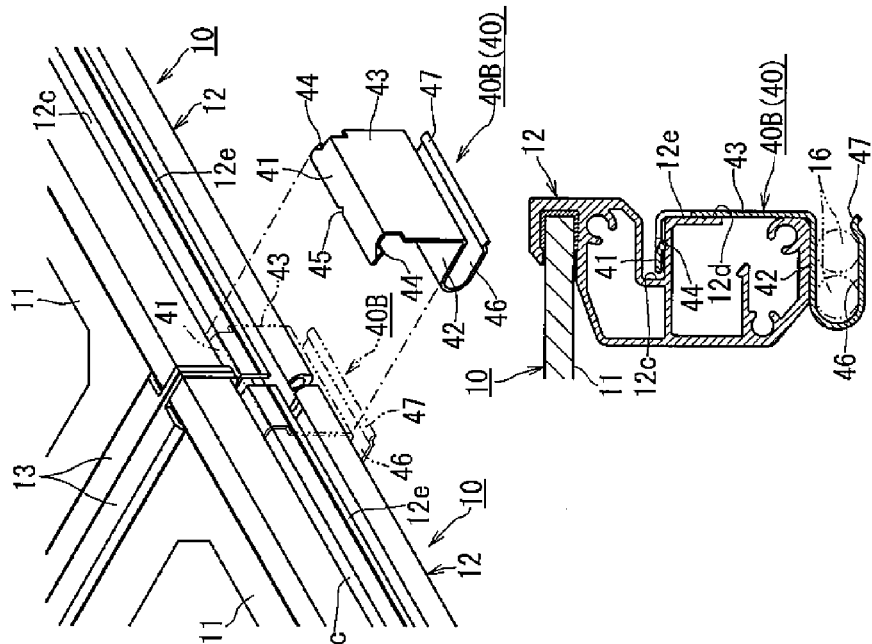
FIG. 8(A) is a diagram for explaining the connections between ornamental covers in the solar photovoltaic system of FIG. 1.
Figure 8B:
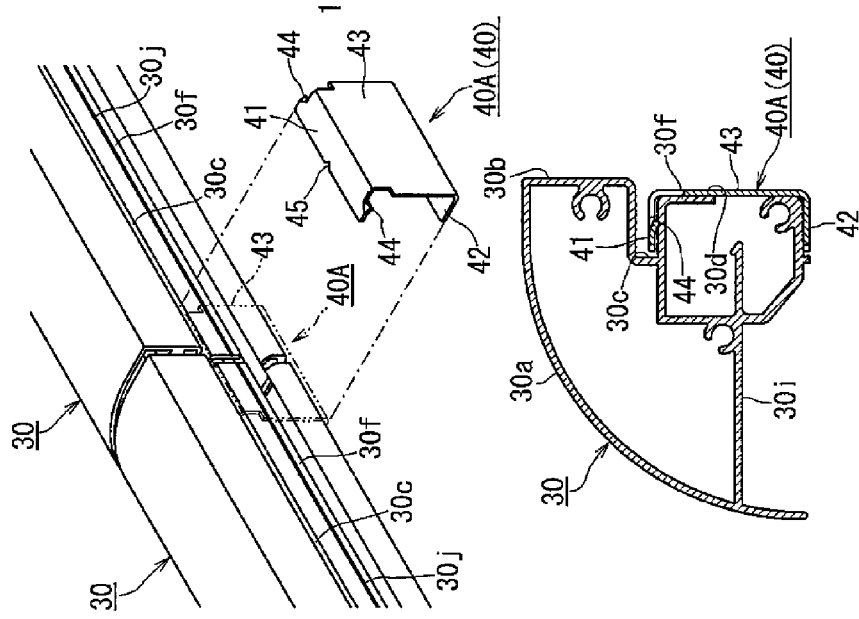
FIG. 8(B) is a diagram for explaining the connections between solar cell modules in the solar photovoltaic system of FIG. 1.

The first frame 12 of the solar cell module 10 on the ridge side is then moved down toward the supporting member 2 (see FIG. 7(E)), and the securing members 20 engaged with the first frame on the ridge side are placed on the supporting member 2. At this point, the securing members 20 are caused to slide in the longitudinal direction of the first frame 12, as in the case of the ornamental covers 30, and are positioned onto the scratch line matching a structural member such as a roof rafter. The bottom faces of the securing members 20 are then bonded to the supporting member 2 with the adhesive layers of the waterproof members 60 on the bottom face of the securing members 20, and the one of the solar cell modules 10 of the first row is secured. As described above, the next solar cell module 10 is then placed adjacent to the solar cell module 10 in the direction perpendicular to the direction of tilt. Also, as in the case of the ornamental covers 30, each of the solar cell modules 10 of the first row are arranged one by one so that the predetermined amount of space S1 is formed between each two solar cell modules 10. After that, each of the securing members 20 are attached and secured to the supporting member 2 through the use of the securing screws 3. At this point, the securing units 21a of the securing members 20 are located in outer positions further than the solar cell modules 10 and the top portions 23 of the securing members 20 when seen in a plan view, so that the securing members 20 can be easily secured with the securing screws 3 from above.

After that, the end portions of the first frames 12 on the ridge side of the solar cell modules 10 are connected to one another with the second connecting members 40B, as shown in FIG. 8(B). With this arrangement, misalignment of the end portions of the solar cell modules 10 can be eliminated, and the appearance can be improved. Further, the solar cell modules 10 can be electrically connected to one another (ground connections) via the second connecting members 40B. For at least the solar cell modules 10 located at the two ends of the first row of solar cell modules 10 secured to the supporting members 2 by the securing members 20, the engaging screws 4 are screwed into the contact portions 12e of the first frames 12 on the ridge side of the solar cell modules 10 through the engaging holes 22a of the securing members 20, so that the securing members 20 and the solar cell modules 10 are fastened to each other with the engaging screws 4 (see FIGS. 4 and 7(F)). With this arrangement, the first frames 12 are restrained by the base units 21 of the securing members 20 from moving downward, and are restrained by the top portions 23 from moving upward. Also, the first frames 12 are restrained by the shaft portions 22 from moving inward (toward the ridge side) along the faces of the solar cell panels 11, and are restrained by the engaged protrusions 25a from moving outward (to the eaves side) along the faces of the solar cell panels 11. Further, the first frames 12 are restrained by the engaging screws 4 from moving outward (to the eaves side) along the faces of the solar cell panels 11, and the solar cell modules 10 are prevented from sliding in the direction perpendicular to the direction of tilt of the roof.

Although not shown in the drawings, as in the case of the ornamental covers 30, a predetermined caulking component is applied to both end portions and the outer peripheries of the ridge side face of each of the securing members 20 securing the solar cell modules 10, so as to cover the waterproof members 60. Although not shown in detail in the drawings, the distributing cables 16 extending from the respective solar cell modules 10 are connected to one another in a predetermined order, before the solar cell modules 10 are secured. Also, the distributing cables 16 are held by the cable holding portions 46 of the second connecting members 40B. Further, to connect the ground cables 5 to the solar cell modules 10, a crimp-type terminal provided at the top end of each of the ground cables 5 is also attached when the engaging screws 4 are screwed, as shown in FIG. 9.

After the solar cell modules 10 of the first row are secured in the above manner, the above-described procedures are repeated to sequentially secure the solar cell modules 10 of the second and third rows. After all the solar cell modules 10 are secured, the eaves-side side face caps 50 and the intermediate side face caps 55 are secured with predetermined screws 6 to the side faces of the ornamental covers 30 and the solar cell modules 10 on both outer sides in the direction perpendicular to the direction of tilt of the roof, as shown in FIG. 10. Then the exposed end portions of the ornamental covers 30 and the first frames 12 on the side face side are covered, and the installment of the solar photovoltaic system 1 is completed.

In the above described embodiment, the securing members 20 are placed and secured directly onto the supporting member 2. However, the present invention is not limited to that, and the securing members 20 may be attached onto the supporting member 2 via plate-like spacer members of 2 to 20 mm in thickness, though not shown in the drawings. Through the use of spacer members of an appropriate thickness depending on the condition of the upper face of the supporting member 2 such as a roof material and the locations at which the securing members 20 are to be secured, the securing members 20 can be secured in substantially the same plane, and the solar photovoltaic system 1 that has the surfaces of the solar cell modules 10 aligned and excels in appearance can be constructed.

Alternatively, a spacer member 70 shown in FIG. 11 may be used. This spacer member 70 includes: a box-like main body 71; a reinforcing rib 72 that vertically extends at the center of the horizontal direction inside the main body 71; a T-shaped connecting portion 73 that is located on the upper face and can be engaged with the slit 21f of a securing member 20; and insertion holes 74 that correspond to the insertion holes 21c of the securing member 20 and penetrate in the vertical direction. The connecting portion 73 is inserted into the slit 21f of the securing member 20, to connect the spacer member 70 to the lower portion of the securing member 20. With this arrangement, each securing member 20 can be lifted up even higher.

As described above, according to this embodiment, the first frames 12 of the solar cell modules 10 engaged with both sides of each of the shaft portions 22 of the securing members 20 are secured to one another, with the predetermined amount of space S2 being kept in between. With this arrangement, even if the solar cell modules 10 thermally expand due to a change in temperature or the like, the expansion is absorbed by the spaces S2, and the first frames 12 are not brought into contact with one another. The solar cell modules 10 are also prevented from being deformed or damaged due to the thermal expansion. Since the spaces 51 are formed between the first frames 12, the load of the solar cell modules 10 on the upper side can be prevented from being transmitted directly to the solar cell modules 10 on the lower side, and an excess load does not act on the securing members 20 supporting the first frames 12 of the solar cell modules 10 of the lowermost row. The securing members 20 can be prevented from being deformed or damaged by the excess load, and can be prevented from slipping off the supporting member 2. Also, the securing strength of the solar cell modules 20 is increased, and the reliability and security of the installment of the solar cell modules 10 can be improved accordingly.

Also, the contact portions 12e of the first frames 12 engaged on the opposite side of the shaft portions 22 of the securing members 20 from the securing units 21a can be fastened to the shaft portions 22 with the engaging screws 4. Accordingly, the supporting strength for the first frames 12 engaged on the opposite side of the shaft portions 22 from the securing units 21a can be improved. Further, a predetermined amount of space is formed between the shaft portions 22 of the securing members 20 on the side of the securing units 21a and the contact portions 12e of the first frames 12. Accordingly, even if the head portions of the engaging screws 4 protrude from the shaft portions 22, the head portions can be accommodated in the spaces, and the first frames 12 and the shaft portions 22 are fastened to each other through the use of the engaging screws 4 having head portions protruding from the shaft portions 22. Also, there is no need to perform counter boring on the engaging holes 22a of the shaft portions 22. Accordingly, an increase in the production costs of the securing members 20 can be prevented, and the operating costs can be lowered by simplifying the fastening operation through the use of the engaging screws 4.

Further, as described above, a predetermined amount of space is formed between the shaft portions 22 and the contact portions 12e of the first frames 12 on the side of the securing units 21a. Accordingly, the crimp-type terminals 5a of the ground cables 5 can be accommodated in the spaces. When the contact portions 12e of the first frames 12 are fastened to the shaft portions 22 with the engaging screws 4, the terminals of the ground cables 5 can also be attached together, and the operation to attach the ground cables 5 can be simplified. Further, the ground cables 5 can be appropriately extended to the outside through the spaces.

Since each of the base units 21 of the securing members 20 has a horizontally long, box-like shape, the rigidity of the base units 21 of the securing members 20 can be further increased. Even if a large load acts on the solar cell modules 10 due to a typhoon, strong wind, heavy rain, accumulated snow, or the like, the securing members 20 can be prevented from being deformed or damaged, and the solar cell modules 10 can be more firmly secured to the predetermined supporting member 2. Also, the upper face of each of the base units 21 on which the first frames 12 are to be placed is made longer, and the first frames 12 of the solar cell modules 10 can be easily placed on the securing members 20. Accordingly, the workability can be improved.

Although a preferred embodiment of the present invention has been described so far, the present invention is not limited to this embodiment, and various changes and modifications in design can be made to it as follows, without departing from the scope of the invention.

Although the above described embodiment is applied to the solar photovoltaic system 1 installed on a roof, the embodiment is not limited to that application, and may be applied to a solar photovoltaic system that is installed on a wall surface or a land surface or the like.

What is claimed is:

1. A solar cell module securing structure for securing to a predetermined supporting member a solar cell module including a plate-like solar cell panel and a frame supporting peripheral sides of the solar cell panel, by engaging a frame horizontally between a base unit and a top portion located on both sides of a shaft portion of a securing member, through the use of the securing member including the base unit, the shaft portion, and the top portion, the base unit having a securing unit for securing the solar cell module to a predetermined supporting member at a location decentered with respect to a center point in a horizontal direction, the shaft portion extending upward from a position on the opposite side of a horizontal-direction center point of an upper face of the base unit from the securing unit, the top portion protruding toward both sides from an upper end of the shaft portion and extending substantially parallel to the upper face of the base unit, the frame including:
an insertion supporting portion supporting the peripheral sides of the solar cell panel inserted thereto and an upper side face extending in a vertical direction on the opposite side from the side on which the solar cell panel is inserted;
a junction portion placed below the insertion supporting portion, and having an opening on the opposite side from the side on which the solar cell panel is inserted, the top portion of the securing member being inserted through the opening; and
a contact portion placed below the junction portion and located on an inner side than the upper side face of the insertion supporting portion in a direction of a face of the solar cell panel, a face of the contact portion being brought into contact with the shaft portion of the securing member,
the securing member further including an inner protrusion placed on the same side of the shaft portion as the securing unit between the top portion and the base unit, the inner protrusion forming a narrower space than a space between the base unit and the top portion, and having an outer end portion extending along a shaft line substantially parallel to the shaft portion, wherein the base unit, the shaft portion, the top portion, and the inner protrusion are integrally formed,
the contact portion of the frame engaged on the opposite side of the shaft portion of the securing member from the securing unit being fastened to the shaft portion with a predetermined fastening member from the same side of the shaft portion as the securing unit through the space of the inner protrusion, a predetermined space being formed between the contact portion and the shaft portion, with the contact portion of the frame engaged on the same side of the shaft portion of the securing member as the securing unit being brought into contact with the outer end portion of the inner protrusion to thereby prevent impaction of the frame, a predetermined amount of space being formed between the facing upper side faces of the frames engaged with both sides of the shaft portion of the securing member,
whereby the predetermined amount of the space formed between the upper side faces of the frames facing each other is capable of absorbing a change in relative locations between the frames facing each other via the securing member, which change is caused by a deformation of at least one of the respective solar cell modules facing each other via the securing member.

2. The solar cell module securing structure according to claim 1, wherein the securing member has the base unit formed into a horizontally long, box-like shape.

3. A frame for solar cell modules for supporting peripheral sides of a solar cell panel in a solar cell module and engaged horizontally between a base unit and a top portion located on both sides of a shaft portion of a securing member, through the use of the securing member including the base unit, the shaft portion, the top portion, and an inner protrusion, the base unit having a securing unit for securing the solar cell module to a predetermined supporting member at a location decentered with respect to a center point in a horizontal direction, the shaft portion extending upward from a position on the opposite side of a horizontal-direction center point of an upper face of the base unit from the securing unit, the top portion protruding toward both sides from an upper end of the shaft portion and extending substantially parallel to the upper face of the base unit, the inner protrusion being placed on the same side of the shaft portion as the securing unit between the top portion and the base unit, the inner protrusion forming a narrower space than the space between the base unit and the top portion, the inner protrusion having an outer end portion extending along a shaft line substantially parallel to the shaft portion, wherein the base unit, the shaft portion, the top portion, and the inner protrusion are integrally formed, the frame comprising:
- an insertion supporting portion supporting the peripheral sides of the solar cell panel inserted thereto and an upper side face extending in a vertical direction on the opposite side from the side on which the solar cell panel is inserted;
- a junction portion placed below the insertion supporting portion, and having an opening on the opposite side from the side on which the solar cell panel is inserted, the top portion of the securing member being inserted through the opening; and
- a contact portion placed below the junction portion and located on an inner side than the upper side face of the insertion supporting portion in a direction of a face of the solar cell panel, a face of the contact portion being brought into contact with the shaft portion of the securing member, the contact portion being brought into contact with the outer end portion of the inner protrusion to close part of the space, whereby the predetermined amount of the space formed between upper side faces of the frames facing each other is capable of absorbing a change in relative locations between the frames facing each other via the securing member, which change is caused by a deformation of at least one of the respective solar cell modules facing each other via the securing member.

4. A securing member for solar cell modules for securing a solar cell module to a predetermined supporting member, the solar cell module having a frame supporting peripheral sides of a plate-like solar cell panel, the securing member comprising:
- a base unit having a horizontally long, box-like shape and has a securing unit for securing the securing member to a predetermined supporting member at a location decentered with respect to a center point in a horizontal direction;
- a shaft portion extending upward from a position on the opposite side of a horizontal-direction center point of an upper face of the base unit from the securing unit;
- a top portion protruding toward both sides from an upper end of the shaft portion and extends substantially parallel to the upper face of the base unit; and
- an inner protrusion placed on the same side of the shaft portion as the securing unit between the top portion and the base unit, the inner protrusion forming a narrower space than a space between the base unit and the top portion, the inner protrusion having an outer end portion extending along a shaft line substantially parallel to the shaft portion, wherein the base unit, the shaft portion, the top portion, and the inner protrusion are integrally formed, the frame of the solar cell module being horizontally engaged between the base unit and the top portion on both sides of the shaft portion, impaction of the frame engaged between the base unit and the top portion being prevented by the outer end portion of the inner protrusion, whereby the predetermined amount of the space formed between upper side faces of the frames facing each other is capable of absorbing a change in relative locations between the frames facing each other via the securing member, which change is caused by a deformation of at least one of the respective solar cell modules facing each other via the securing member.

* * * * *